March 5, 1935.  G. G. LOWRY  1,993,450
MIXING PLATE FOR CEMENTS, ARTIFICIAL ENAMELS, AND MEDICAMENTS
Filed Nov. 10, 1933

Inventor
George G. Lowry
By Bryant V. Lowry
Attorneys

Patented Mar. 5, 1935

1,993,450

UNITED STATES PATENT OFFICE 1,993,450

MIXING PLATE FOR CEMENTS, ARTIFICIAL ENAMELS, AND MEDICAMENTS

George G. Lowry, Pittsburgh, Pa., assignor of one-half to Samuel Lowry Henry, Pittsburgh, Pa.

Application November 10, 1933, Serial No. 697,511

4 Claims. (Cl. 32—39)

This invention relates to certain new and useful improvements in mixing plates for cements, artificial enamels and medicaments.

The primary object of the invention is to provide a mixing plate for cements, artificial enamels and medicaments, especially for dental use wherein the mixing plate is preferably formed of chrome-nickel alloy or a similar material that is resistive to the actions of acid and lends itself to a more perfect cleaning or sterilization action without any resultant deleterious effect.

It is a further object of the invention to provide a mixing plate for dental use of the foregoing character, preferably constructed of chrome-nickel alloy that has one face thereof highly polished to a mirror finish that especially renders the plate impervious or immune to the action of acid, it being primarily intended to use the mirror finished side of the plate for the mixing of cements or enamels as the surface is absolutely smooth and no irregularities in the surface are present to offer resistance to a thorough mixing of the cements and enamels. The other face of the mixing plate is provided with a satin finish and may be used for the mixing of medicaments and presents sufficient resistance to effect a more complete mixing of medicaments.

A further object of the invention is to provide a dental mixing plate removably mounted upon a base support and readily detachable therefrom for the purpose of cleaning or sterilization.

Another object of the invention is to provide a dental mixing plate including a base member for the support thereof that has a central opening for the insertion of the user's finger to effect upward displacement of the mixing plate that when in position on the base support substantially lies flush with the upper surface of the support.

It is a further object of the invention to provide a mixing plate arrangement of the foregoing character wherein a pair of rods is pivoted in the base member or support with lateral projections on their inner adjacent ends and adapted to be engaged with the underside of the removable mixing plate for raising the same upwardly and removing it from the base support should the plate become wedged in the support or should it be necessary to remove the plate while the base support is flatly resting upon a table or other flat surface.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1:
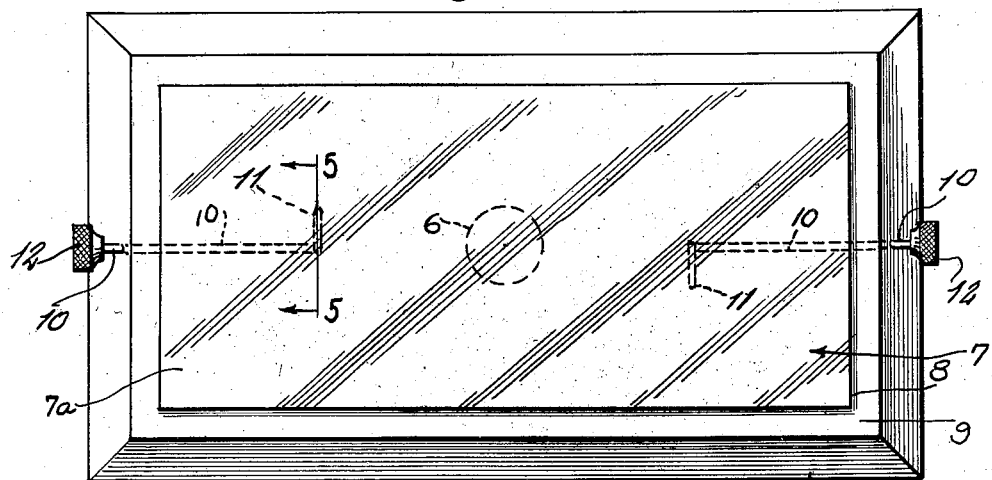
Figure 1 is a top elevational view of the device embodying this invention.
Figure 2:
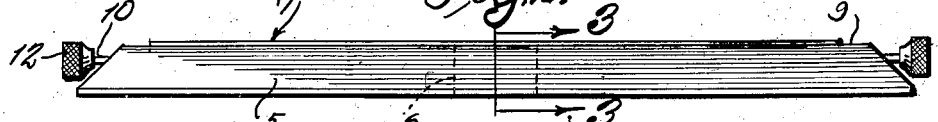
Figure 2 is a side elevational view illustrating the manually operated removing rod journalled in the base member.
Figure 3:
Figure 3 is a transverse cross-sectional view taken on line 3—3 of Figure 2, looking in the direction of the arrows and illustrating the central opening for facilitating the removal of the mixing plate.

Referring more in detail to the accompanying drawing, there is illustrated a mixing plate for cement, enamels, medicaments and the like, the reference character 5 designating a base supporting member that is preferably of rectangular formation in plan view and constructed of any suitable material, such as will readily lend itself to a sterilization process. A vertical opening 6 is provided centrally of the base supporting member 5 and the upper side of said supporting member is provided with a rectangular depression or recess for the reception of a mixing plate 7 that overlies the opening 6. The depression or recess 8 in the upper face of the base supporting member 5 is dimensioned with respect to the thickness of the plate 7 as to present the upper side of the plate substantially flush with the marginal portion 9 at the upper side of the base supporting member for the effective retention of the mixing plate in the supporting member which eliminates accidental displacement of the plate and also renders it extremely difficult to remove the plate by the use of the fingers or the instruments applied to the marginal edge of the plate. Means for effecting ready removal of the plate are to be later described.

Figure 4:
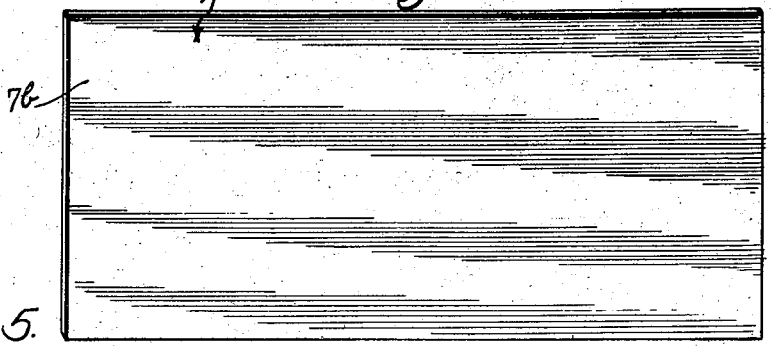
Figure 4 is a top elevational view of the mixing plate or slab.

The mixing plate 7 is preferably formed of metal, and the use of chrome-nickel alloy has by tests been found to be highly efficient because metal of such character readily lends itself to sterilization without resultant deleterious effects. The face 7a of the mixing plate 7 as shown in Figure 1 has a highly polished mirror finish and readily lends itself to the mixing of cement, enamels and the like and presents a surface that is entirely free of any roughness or irregularities so that a more perfect mixing of the cement, enamels and the like may be effected. The other face 7b of the mixing plate 7 as shown in Figure 4 has a satin finish and is primarily intended for the mixing of medicaments, this satin finish producing just sufficient resistance or agitation of the medicament for the more effective mixing thereof.

Figure 5:
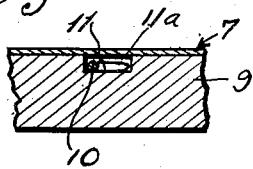
Figure 5 is a detail sectional view taken on line 5—5 of Figure 1.

To effect removal of the mixing plate 7 from the base supporting member 5, it is only necessary to insert a finger in the opening 6 and exert upward pressure on the underside of the mixing plate to free it from its frictional marginal contact with the walls of the recess 8. Means is also provided for effecting removal of the mixing plate from the base supporting member 5 while the latter is resting upon a flat support, such as a table and includes a pair of shafts 9, respectively journaled longitudinally of the base supporting member 5 as shown in Figure 1, with the inner adjacent end of each shaft 10 provided with an angularly directed finger 11 that lies in a recess 11a in the bottom wall of the recess 8 as shown in Figure 5, thereby providing a clearance for the flat support of the mixing plate 7 upon the bottom wall of the recess 8. A knurled knob 12 is carried by the outer end of each shaft 10 to effect rotation thereof and movement of the angle finger 11 to cause the same to be moved upwardly out of its recess 11a and into engagement with the underside of the mixing plate 7 for displacement thereof from the recess 8 of the base supporting member 5.

The mixing plate 7 being formed of chrome-nickel alloy or similar material retains indefinitely the highly polished finish and possesses a sanitary appearance that is pleasing to a person who watches the dentist mix the different materials and as stated, the mixing plate is easily sterilized in a hot bath or by other means without destroying its mirrored and satin finish or deleteriously affecting other properties thereof. It is also to be understood that the base supporting member 5 may be constructed of material that readily lends itself to sterilization processes without detrimental effects.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. A dental plate of the character described comprising a base member having a recess formed in the top thereof, a removable mixing plate received in said recess and means carried by the base member adapted to be moved into engagement with the underside of the plate for elevating the same and removing it from the base.

2. A dental plate comprising a base having a recess formed in the top wall thereof, a metallic mixing plate received in said recess and manually operable means at opposite ends of the base adapted to be engaged with the underside of the plate for displacing the removable mixing plate.

3. A dental mixing plate comprising a base member having a recess formed in the top wall thereof and a central opening, a metallic mixing plate received in said recess, rods journalled in the ends of the base member having angular portions adapted to engage the underside of the metallic mixing plate and knurled thumb pieces secured to the outer ends of the rods whereby the rods may be rotated manually for removing the mixing plate from said recess.

4. A device of the character described comprising a base member having a recess in its upper face, a metallic mixing plate seated in the recess, a rod journalled in the base member in a plane parallel with the upper and lower faces of the base member, a finger projection on the inner end of the rod for engagement with the underside of the plate and a knurled head on the outer end of the rod for operation thereof.

GEORGE G. LOWRY.